(12) United States Patent
Ma et al.

(10) Patent No.: US 9,690,736 B2
(45) Date of Patent: Jun. 27, 2017

(54) MANAGING STATE TRANSITIONS OF A DATA CONNECTOR USING A FINITE STATE MACHINE

(75) Inventors: Dennis Ma, Austin, TX (US); Samuel Vincent, Tracy, CA (US)

(73) Assignee: NVIDIA Corporation, Santa Clara, CA (US)

( * ) Notice: Subject to any disclaimer, the term of this patent is extended or adjusted under 35 U.S.C. 154(b) by 802 days.

(21) Appl. No.: 13/545,915

(22) Filed: Jul. 10, 2012

(65) Prior Publication Data

US 2014/0019742 A1  Jan. 16, 2014

(51) Int. Cl.
*G06F 13/40* (2006.01)
(52) U.S. Cl.
CPC ............................... *G06F 13/4027* (2013.01)
(58) Field of Classification Search
CPC ...... G06F 1/3203; G06F 1/324; G06F 1/3296; G06F 9/00
USPC ......................................................... 713/100
See application file for complete search history.

(56) References Cited

U.S. PATENT DOCUMENTS

| | | | | |
|---|---|---|---|---|
| 7,949,817 B1* | 5/2011 | Sakarda | ....................... | 710/307 |
| 8,711,653 B2* | 4/2014 | Nayak et al. | .............. | 365/233.1 |
| 2006/0291501 A1* | 12/2006 | Nicol et al. | ................... | 370/465 |
| 2007/0234100 A1* | 10/2007 | Baker et al. | .................. | 713/600 |
| 2008/0212553 A1* | 9/2008 | Shiu et al. | ..................... | 370/343 |
| 2009/0204831 A1* | 8/2009 | Cousson | .............. | G06F 1/3203 713/322 |
| 2012/0102345 A1* | 4/2012 | Park et al. | ..................... | 713/322 |
| 2012/0198266 A1* | 8/2012 | Hofmann | .................. | G06F 1/06 713/501 |

* cited by examiner

*Primary Examiner* — Kim Huynh
*Assistant Examiner* — Danny Chan
(74) *Attorney, Agent, or Firm* — Artegis Law Group, LLP

(57) ABSTRACT

A microprocessor within a processing unit is configured to manage to operation of a finite state machine (FSM) that, in turn, manages the operation of a data connector. The FSM may be a hardwired chip component that adheres to a communication protocol associated with the data connector. The microprocessor is configured to execute a software application in order to (i) apply configuration changes to the processing unit during state transitions initiated by the FSM and (ii) cause the FSM to initiate specific state transitions.

24 Claims, 5 Drawing Sheets

MANAGING STATE TRANSITIONS OF A DATA CONNECTOR USING A FINITE STATE MACHINE

BACKGROUND OF THE INVENTION

Field of the Invention

The present invention generally relates to data connectors, and, more specifically, to a system and method for managing state transitions of a data connector.

Description of the Related Art

A typical data connector, such as a peripheral component interface (PCI) or PCI express (PCIe), allows different processing units within a computer system to exchange data with one another. For example, a conventional computer system could include a central processing unit (CPU) that exchanges data with a graphics processing unit (GPU) across a PCIe bus.

A processing unit coupled to the data connector, such as the GPU in the example above, usually includes a hardwired finite state machine (FSM) that manages the different operating states of the data connector. This FSM is responsible for training the data connector between those different operating states. The operating states could be, for example, a nominal operating state, an error recovery state, an "off" state, and so forth, as is known in the art. When the processing unit needs to change the operating state of the data connector to a new operating state, the FSM is notified of the required change. The FSM then initiates one or more state transitions in order to train the data connector to the new operating state.

The sequence of state transitions required to effect certain changes is defined in a communication protocol associated with the data connector. In order to comply with the communication protocol, a manufacturer of the processing unit designs the FSM within that processing unit to train the data connector between different operating states according to the precise requirements of that protocol.

One problem with such an arrangement is that any flaws in the design of the FSM, as defined in the communication protocol, are propagated into the design of the logic that implements the FSM within the processing unit. Further, since the FSM is hardwired, a designer of the processing unit cannot correct those flaws after the processing unit is fabricated. Shipping a product with known flaws is unacceptable in most circumstances.

Accordingly, what is needed in the art is a more effective technique for managing state transitions associated with a data connector.

SUMMARY OF THE INVENTION

One embodiment of the present invention sets forth a method for managing the operation of a data connector coupled to a hardware unit. The method includes receiving a pause signal from a finite state machine (FSM) hardwired into the hardware unit, where the FSM is configured to maintain the operating state of the data connector and to transition the data connector between operating states, applying one or more configuration changes to at least one of the hardware unit and the data connector during a transition between operating states associated with the data connector, and transmitting a continue signal to the FSM notifying the FSM that the one or more configuration changes have been applied.

An advantage of the techniques described herein is that the microprocessor may be configured to take control of the hardwired FSM by executing a software application. Further, that software application may be easily updated to modify the functionality of the FSM, thereby allowing the microprocessor to compensate for any flaws in the FSM.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
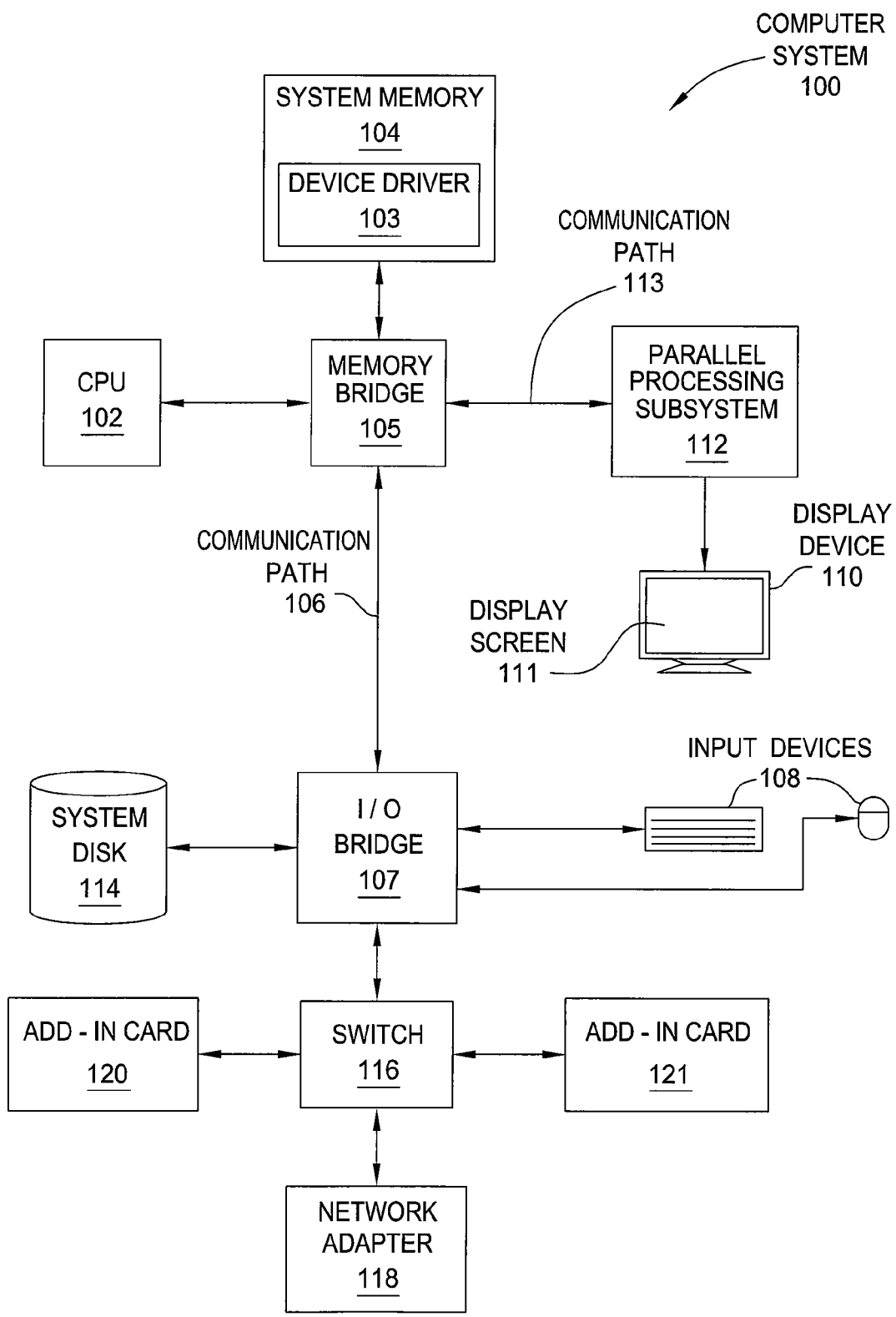
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) express, Accelerated Graphics Port (AGP), or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
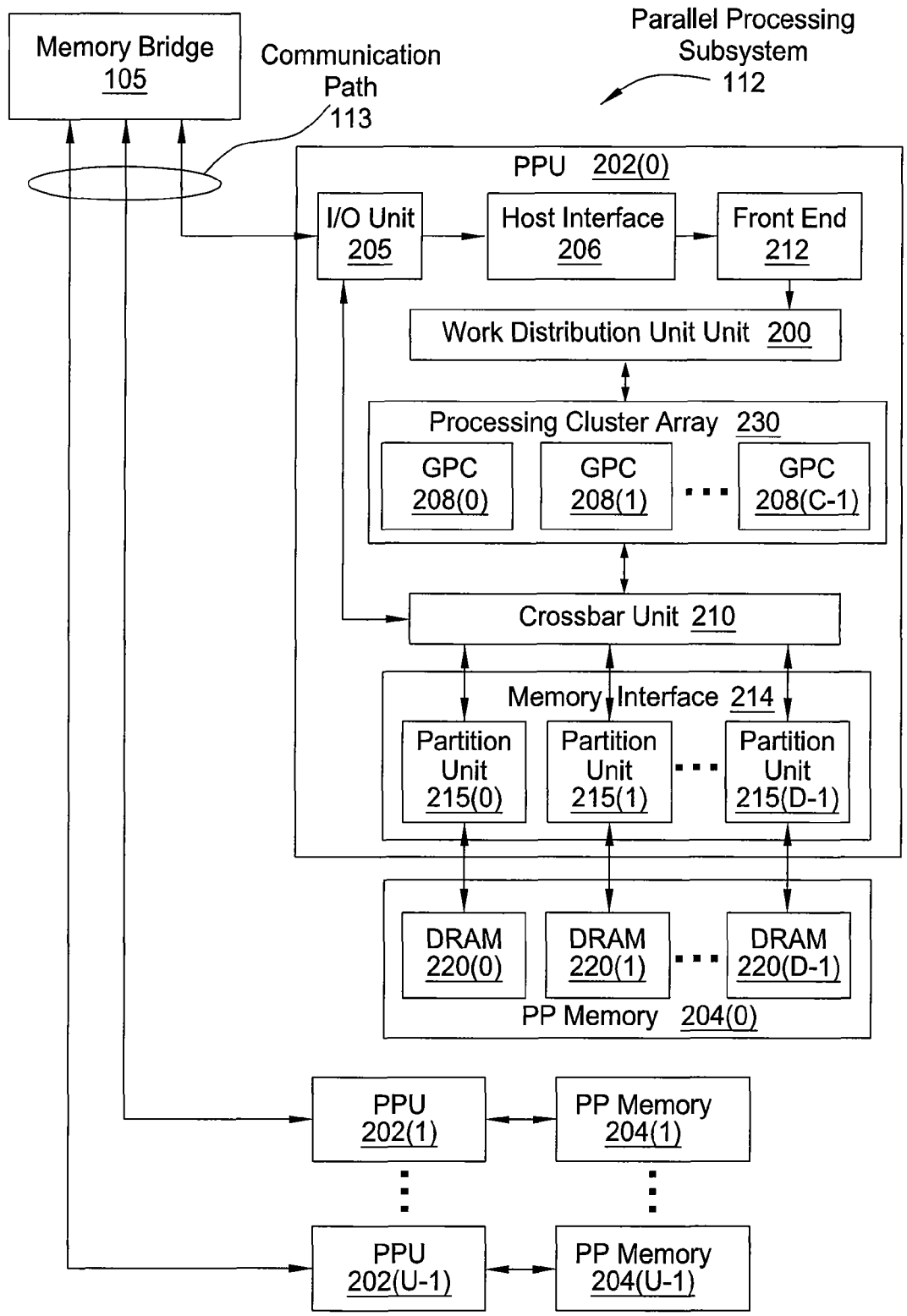
FIG. 2 is a block diagram of a parallel processing subsystem of the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that dynamic random access memories (DRAMs) 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCIe) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Managing Data Connector State Transitions

Figure 3:
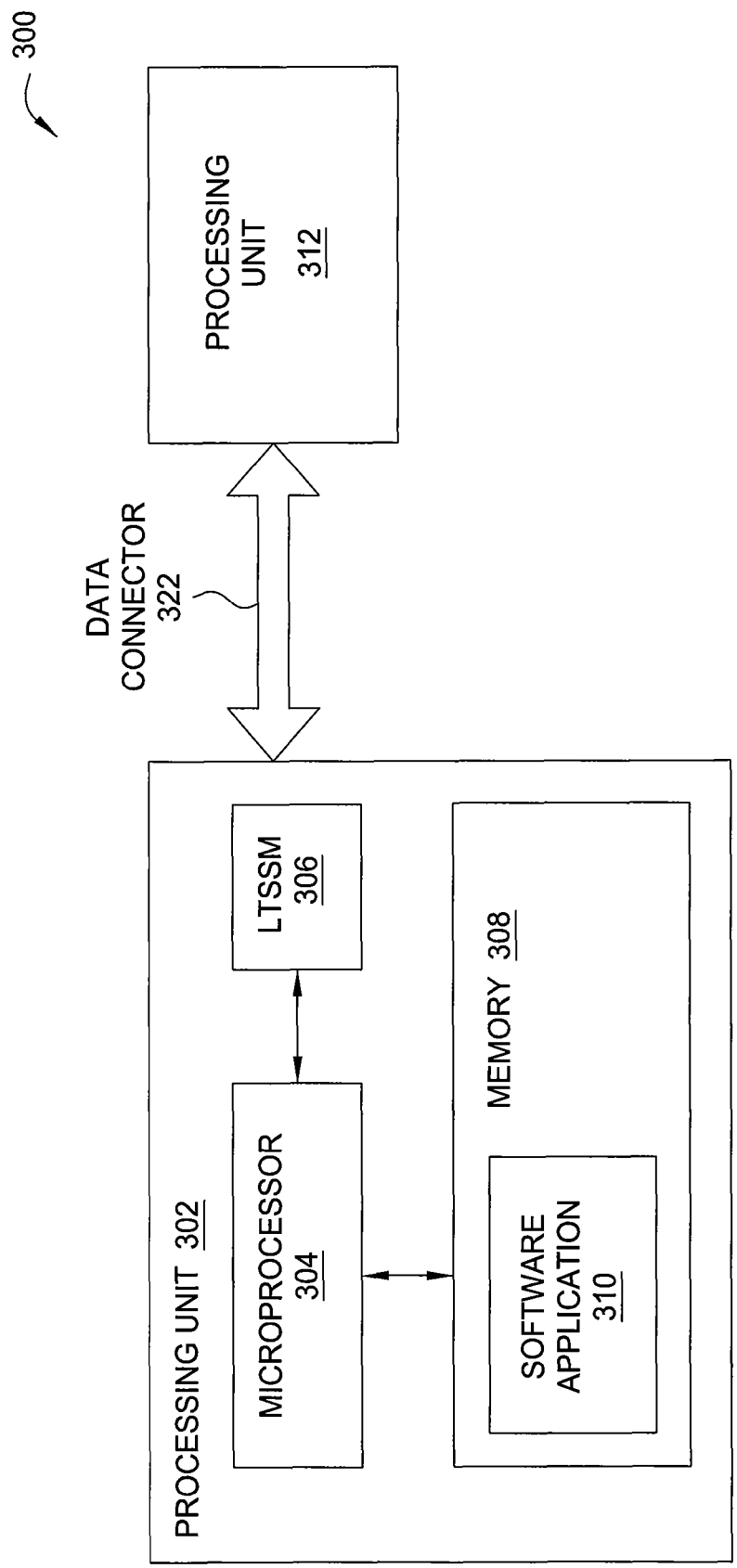
FIG. 3 is a block diagram that illustrates processing units coupled together with a data connector, according to one embodiment of the present invention.

FIG. 3 is a block diagram that illustrates processing units 302 and 312 coupled together with a data connector 322, according to one embodiment of the present invention. Each of processing units 302 and 312 could be, e.g., a CPU, a GPU, a parallel processing unit (PPU), or any combination of devices capable of processing data. In one embodiment, processing unit 302 is implemented by parallel processing subsystem 112 and processing unit 312 is implemented by CPU 102 (both shown in FIG. 1). In another embodiment, processing units 302 and 312 are included within a handheld computing device, such as a mobile phone, tablet computer, and the like.

Data connector 322 is a bus that allows processing units 302 and 312 to exchange data with one another. Data connector 322 could be, for example, a PCIe bus or a universal serial bus (USB), among others. Data connector 322 supports a particular communication protocol that processing units 302 and 312 implement in order to transmit data, in the form of packets, across data connector 322. In one embodiment, data connector 322 is a PCIe bus and supports a communication protocol established by the PCIe specification.

As shown, processing unit 302 includes a microprocessor 304 coupled to a link status and state machine (LTSSM) 306 and a memory 308. Memory 308 includes a software application 310. Microprocessor 304 may be an embedded processor, an application specific integrated circuit (ASIC), a collection of logic gates, or another type of device capable of processing data and executing software application. Memory 308 could be, e.g., a RAM module, a set of hardware registers, a collection of different memory modules, or any other technically feasible type of module capable of storing data. Microprocessor 304 may execute software application 310 residing within memory 308 in order to perform the functionality described herein.

LTSSM 306 is a hardwired finite state machine (FSM) responsible for managing the operating state of data connector 322. In general, the operating states and state transitions associated with LTSSM 306 are defined by the communication protocol associated with data connector 322. An exemplary portion of an FSM that may be implemented by LTSSM 306 is discussed below in conjunction with FIG. 4.

Figure 4:
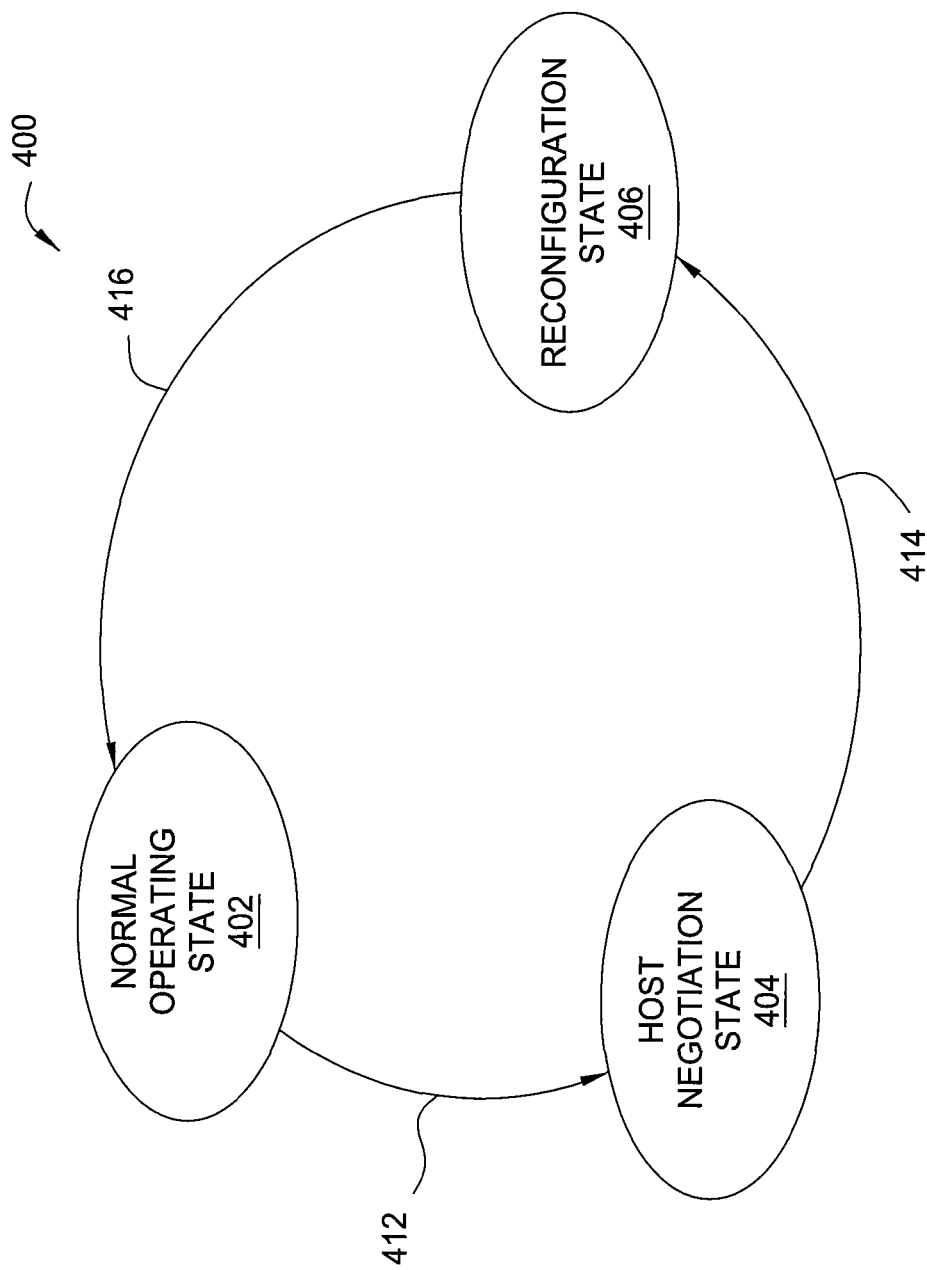
FIG. 4 is a conceptual diagram that illustrates a portion of a finite state machine (FSM), according to one embodiment of the present invention.

FIG. 4 is a conceptual diagram that illustrates an exemplary portion of an FSM that may be implemented by LTSSM 306 shown in FIG. 3, according to one embodiment of the present invention. Portion of an FSM 400 may be used, for example, to change to operating speed of data connector 322 shown in FIG. 3.

As shown, portion of an FSM 400 includes a set of operating states, such as a nominal operating state 402, a host negotiation state 404, and a reconfiguration state 406. Arc 412 connects nominal operating state 402 to host negotiation state 404, arc 414 connects host negotiation state 404 to reconfiguration state 406, and arc 416 connects reconfiguration state 406 back to nominal operating state 402. When LTSSM 306 implements portion of a state machine 400, LTSSM 306 may initiate a sequence of state transitions through the different operating states shown in FIG. 4 in order to reconfigure processing unit 302 and/or data connector 322.

For example, LTSSM 306 may reconfigure processing unit 302 to transmit data across data connector 322 at a higher speed by sequentially transitioning between the operating states of portion of an FSM 400. First, LTSSM 306 transitions from nominal operating state 402 to host negotiation state 404 along arc 412. At host negotiation state 404, LTSSM 306 may negotiate a new transmission speed with processing unit 312. LTSSM 306 then transitions to reconfiguration state 406 along arc 414. At reconfiguration state 406, LTSSM 306 may increase the transmission speed associated with data connector 322 to the newly negotiated speed. LTSSM may then transition back to nominal operating state 402 along arc 416.

Portion of an FSM 400 is presented here for exemplary purposes only. Persons skilled in the art will recognize that portion of an FSM 400 represents a highly simplified FSM that could be used to manage the operating state of data connector 322. As mentioned above, the FSM implemented by LTSSM 306 includes a set of operating states and state transitions defined by the communication protocol associated with data connector 322.

Referring back now to FIG. 3, microprocessor 304 is configured to interact with LTSSM 306 and to (i) apply configuration changes to processing unit 302 and/or data connector 322 during state transitions initiated by LTSSM 306 and/or (ii) cause LTSSM 306 to initiate specific state transitions. LTSSM 306 is configured to notify microprocessor 304 when specific state transitions occur by transmitting a "pause" signal to microprocessor 304 that specifies LTSSM 306 is paused mid-transition. The pause signal may also indicate the particular states between which LTSSM 206 is mid-transition. When microprocessor 304 receives the pause signal, various configuration changes may safely be made to processing unit 302 and/or data connector 322 without adversely affecting any data that may be in transmission across data connector 322.

For example, when LTSSM 306 initiates a sequence of state transitions in order to increase the transmission speed of data connector 322, LTSSM 306 could notify microprocessor 304 via the pause signal. Microprocessor 304 may then apply configuration changes to processing unit 302 and/or data connector 322. Those changes could include configuring processing unit 302 to operate with a different voltage or to transmit data across data connector 322 with a different voltage in preparation for the subsequent change in transmission speed. In general, when microprocessor 304 receives the pause signal, microprocessor 304 may effect any configuration changes to processing unit 302 and/or data connector 322 or perform any other activities that need to occur when data connector 322 is not in use. Once microprocessor 304 has applied the configuration changes, microprocessor 304 determines that LTSSM 306 may safely resume the sequence of state transitions, and then notifies LTSSM 306 that the sequence of state transitions may continue via a "continue" signal. The "pause" and "continue" signals described herein may be implemented by register transactions, on-chip wires, sideband signals, or any other technically feasible approach to communicating signals between chip components. In one embodiment, once microprocessor 304 has completed the application of any necessary configuration changes, microprocessor 304 also then configures LTSSM 306 to transition to a particular operating state.

In practice, microprocessor 304 could apply a variety of different configuration changes to processing unit 302 and/or data connector 322 that affect how processing 302 and data connector 322 interact with one another. Those configuration changes could include changing analog settings on drivers associated with processing unit 302 or performing equalization routines that involve data connector 322, among others. Any of the configuration changes applied by microprocessor 304 may be specified within software application 310, which, when executed by microprocessor 304, would cause microprocessor 304 to apply the specified configuration changes to processing unit 302 and/or data connector 322. For example, software application 310 could specify a particular equalization routine that involves exploring the parameter space associated with a set of filters (e.g., finite impulse response (FIR) filters, etc.) used to transform outgoing and incoming transmissions sent and received via data connector 322. Microprocessor 304 could execute software application 310 in order to perform that equalization routine when LTSSM 306 is transitioning between operating states and has sent the pause signal to microprocessor 304.

In one embodiment, software application 310 provides a mapping between specific state transitions that may be initiated by LTSSM 306 and specific configuration changes that may be applied by microprocessor 304 during those state transitions. In a further embodiment, software application 310 also specifies specific state transitions to be initiated by LTSSM 306 under particular conditions. Microprocessor 304 may execute software application 310 to cause LTSSM 306 to initiate those specific state transitions when the particular conditions are met. In another embodiment, software application is included within or derived from device driver 103 shown in FIG. 1.

By implementing the techniques described above, microprocessor 304 may be configured to "take over" operation of LTSSM 306 in order to apply different configuration changes. This functionality allows microprocessor 304 to implement "work-arounds" that improve the hardwired operation of LTSSM 306. In situations where LTSSM 306 is hardwired with a particular flaw or idiosyncrasy based on the communication protocol associated with data connector 322, microprocessor 304 may be programmed (e.g., via software application 310) to compensate for that flaw or idiosyncrasy.

In one embodiment, the functionality performed by processing unit 302 may be performed by another type of hardware unit that (i) is compatible with the communication protocol associated with data connector 322, (ii) includes microprocessor 304 and LTSSM 306, and (iii) is capable of applying configuration changes to processing unit 302 between state transitions implemented by LTSSM 306. The hardware unit performing the functionality of processing unit 302 in this embodiment could be, e.g., a hard disk drive, a printed circuit board, or a video card, among other types of hardware devices. In a further embodiment, the functionality of processing unit 312 may be performed by any type of hardware unit that is compatible with the communication protocol associated with data connector 322. In various other embodiments, microprocessor 304 within processing unit 302 comprises (i) a hardwired circuit configured to perform the functionality discussed above or (ii) a processing unit configured to execute a software application in order to perform the functionality discussed above.

Figure 5:
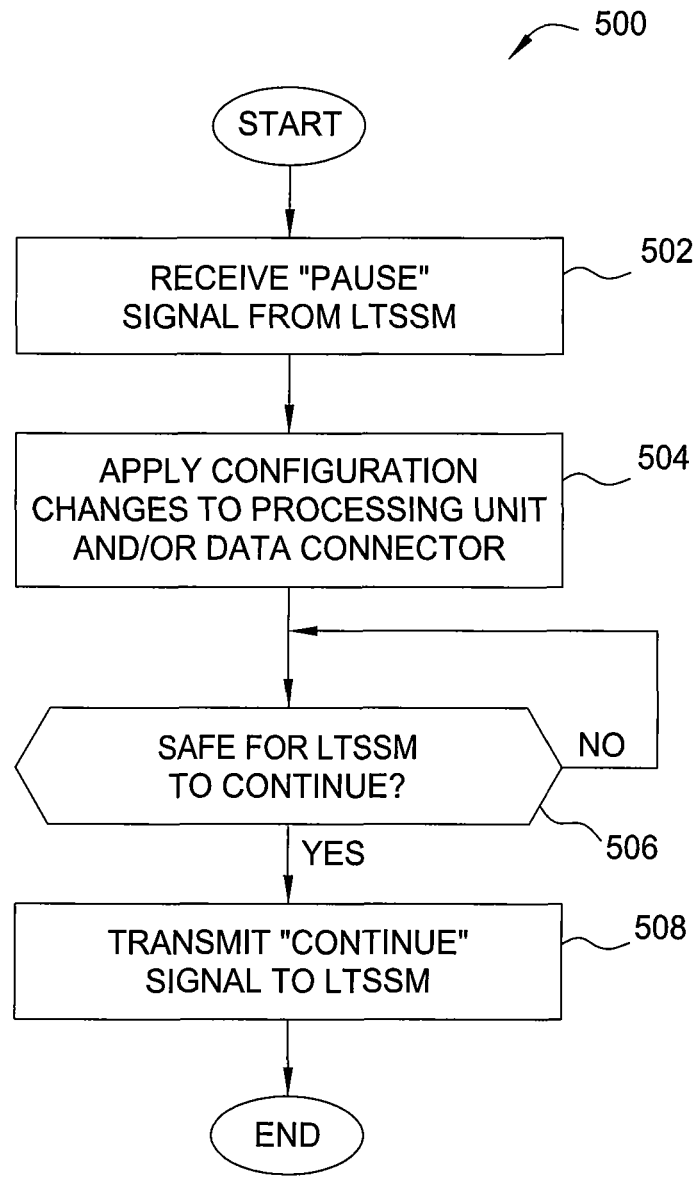
FIG. 5 is a flowchart of method steps for coordinating configuration changes to a processing unit with state transitions associated with a data connector, according to one embodiment of the present invention.

FIG. 5 is a flowchart of method steps for coordinating configuration changes to processing unit 302 with state transitions associated with data connector 322. Although the method 500 is described in conjunction with the systems of FIGS. 1-3, persons skilled in the art will understand that any system configured to perform the method steps, in any order, is within the scope of the invention. The method 500 is performed by microprocessor 304 within processing unit 302.

As shown, the method begins at step 502, where microprocessor 304 receives a "pause" signal from LTSSM 306. The pause signal indicates to microprocessor 304 that LTSSM 306 is transitioning between operating states and that configuration changes may be safely applied to processing unit 302 without adversely affecting data transmissions across data connector 322. The pause signal may be implemented by register transactions, on-chip wires, sideband signals, or any other technically feasible approach to communicating signals between chip components.

At step 504, microprocessor 304 applies one or more configuration changes to processing unit 302 and/or data connector 322. The configuration changes could include, for example, changing a transmission voltage associated with data connector 322 or performing an equalization routine with data connector 322 in order to change various parameters, among others. The configuration changes may be specified within software application 310 and may include causing LTSSM 306 to initiate a specific state transition. Processing unit 302 may execute software application 310 in order to apply those configuration changes. In one embodiment, software application 310 provides a mapping between specific state transitions that may be initiated by LTSSM 306 and specific configuration changes that may be applied by microprocessor 304 during those state transitions. In a further embodiment, software application 310 also specifies specific state transitions to be initiated by LTSSM 306 under particular conditions. While performing step 504, microprocessor 304 may execute software application 310 to cause LTSSM 306 to initiate those specific state transitions when the particular conditions are met. Software application 310 may be configured to write to registers associated with LTSSM 306 that, when read by LTSSM 306, direct LTSSM 306 to pause during specific state transitions. When paused, LTSSM 306 transmits the pause signal to microprocessor 304, as discussed.

At step 506, microprocessor 304 determines whether LTSSM 306 may safely continue operation. Microprocessor 304 determines that LTSSM 306 may safely continue operation based on whether the configuration changes applied by microprocessor 304 at step 504 have successfully taken effect. When microprocessor 304 determines that LTSSM 306 may safely continue operation, the method 500 proceeds to step 508.

At step 508, microprocessor 304 transmits a "continue" signal to LTSSM 306. LTSSM 306 may then resume operation and transitions to a subsequent operating state. The method 500 then ends.

In sum, a microprocessor within a processing unit is configured to manage to operation of a finite state machine (FSM) that, in turn, manages the operating states of a data connector. The FSM is a hardwired chip component that adheres to a communication protocol associated with the data connector. The microprocessor is configured to execute a software application in order to (i) apply configuration changes to the processing unit during state transitions initiated by the FSM and (ii) cause the FSM to initiate specific state transitions.

Advantageously, the microprocessor may be configured to take control of the hardwired FSM by executing a software application. Further, that software application may be easily updated to modify the functionality of the FSM, thereby allowing the microprocessor to compensate for any flaws in the FSM.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The scope of embodiments of the present invention is set forth in the following claims.

The invention claimed is:

1. A computer-implemented method for managing the operation of a data connector coupled to a hardware unit, the method comprising:
receiving a pause signal from a finite state machine (FSM) included in the hardware unit, wherein the FSM is configured to maintain the operating state of the data connector and to transition the data connector between operating states, the pause signal indicating that the FSM is transitioning between operating states;
in response to receiving the pause signal, applying one or more configuration changes to at least one of the hardware unit and the data connector during a transition between operating states associated with the data connector, wherein applying the one or more configuration changes comprises changing one or more parameters of a set of filters associated with the data connector; and
transmitting a continue signal to the FSM notifying the FSM that the one or more configuration changes to the hardware unit and the data connector have been applied.

2. The computer-implemented method of claim 1, wherein applying the one or more configuration changes comprises configuring the hardware unit to transmit data signals across the data connector with an increased or decreased voltage level or configuring the hardware unit to operate with an increased or decreased voltage level.

3. The computer-implemented method of claim 1, wherein applying the one or more configuration changes comprises causing the FSM to initiate a state transition specified by a software application.

4. The computer-implemented method of claim 1, wherein applying the one or more configuration changes comprises performing an equalization routine with the data connector and, based on results derived from the equalization routine, changing one or more parameters associated with filters applied to data signals transmitted across the data connector.

5. The computer-implemented method of claim 1, wherein applying the one or more configuration changes comprises changing analog settings within one or more drivers associated with the hardware unit.

6. The computer-implemented method of claim 1, wherein the hardware unit comprises a graphics processing unit (GPU).

7. The computer-implemented method of claim 1, wherein the data connector comprises a peripheral component interface express (PCIe) connector or universal serial bus (USB) connector.

8. The computer-implemented method of claim 1, wherein, in response to receiving the pause signal, the one or more configuration changes are applied to the hardware unit and the data connector when the data connector is not in use.

9. A non-transitory computer-readable medium that, when executed by a processing unit, causes the processing unit to manage the operation of a data connector coupled to a hardware unit, by performing the steps of:
receiving a pause signal from a finite state machine (FSM) included in the hardware unit, wherein the FSM is configured to maintain the operating state of the data connector and to transition the data connector between operating states based on data stored in a set of registers that are coupled to the FSM and populated by the processing unit when executing the non-transitory computer-readable medium, the pause signal indicating that the FSM is transitioning between operating states;
in response to receiving the pause signal, applying one or more configuration changes to at least one of the hardware unit and the data connector during a transition between operating states associated with the data connector, wherein applying the one or more configuration changes comprises changing one or more parameters of a set of filters associated with the data connector; and
transmitting a continue signal to the FSM notifying the FSM that the one or more configuration changes to the hardware unit and the data connector have been applied.

10. The non-transitory computer-readable medium of claim 9, wherein the step of applying the one or more configuration changes comprises configuring the hardware unit to transmit data signals across the data connector with an increased or decreased voltage level or configuring the hardware unit to operate with an increased or decreased voltage level.

11. The non-transitory computer-readable medium of claim 9, wherein the step of applying the one or more configuration changes comprises causing the FSM to initiate a state transition specified by the non-transitory computer-readable medium.

12. The non-transitory computer-readable medium of claim 9, wherein the step of applying the one or more configuration changes comprises performing an equalization routine with the data connector and, based on results derived from the equalization routine, changing one or more parameters associated with filters applied to data signals transmitted across the data connector.

13. The non-transitory computer-readable medium of claim 9, wherein the step of applying the one or more configuration changes comprises changing analog settings within one or more drivers associated with the hardware unit.

14. The non-transitory computer-readable medium of claim 9, wherein the hardware unit comprises a graphics processing unit (GPU).

15. The non-transitory computer-readable medium of claim 9, wherein the data connector comprises a peripheral component interface express (PCIe) connector or universal serial bus (USB) connector.

16. A computing device configured to manage the operation of a data connector coupled to a hardware unit, comprising:
the data connector; and
the hardware unit, including:
a finite state machine (FSM) configured to maintain the operating state of the data connector and to transition the data connector between operating states, and
a subsystem configured to:
receive a pause signal from the FSM, the pause signal indicating that the FSM is transitioning between operating states,
in response to receiving the pause signal, applying one or more configuration changes to at least one of the hardware unit and the data connector during a transition between operating states associated with the data connector, wherein applying the one or more configuration changes comprises changing one or more parameters of a set of filters associated with the data connector; and
transmit a continue signal to the FSM notifying the FSM that the one or more configuration changes to the hardware unit and the data connector have been applied.

17. The computing device of claim 16, further comprising:
a memory coupled to the subsystem and including a software application that, when executed by the subsystem, cause the subsystem to:
receive the pause signal from the FSM,
apply the one or more configuration changes to the hardware unit and/or the data connector; and
transmit the continue signal to the FSM.

18. The computing device of claim 16, wherein the subsystem applies the one or more configuration changes by configuring the hardware unit to transmit data signals across the data connector with an increased or decreased voltage level, configuring the hardware unit to operate with an increased or decreased voltage level, or changing analog settings within one or more drivers associated with the hardware unit.

19. The computing device of claim 16, wherein the subsystem applies the one or more configuration changes by causing the FSM to initiate a state transition specified by a software application residing within a memory coupled to the subsystem.

20. The computing device of claim 16, wherein the subsystem applies the one or more configuration changes by performing an equalization routine with the data connector and, based on results derived from the equalization routine, changing one or more parameters associated with filters applied to data signals transmitted across the data connector.

21. The computing device of claim 16, wherein the hardware unit comprises a graphics processing unit (GPU), and the data connector comprises a peripheral component interface express (PCIe) connector or universal serial bus (USB) connector.

22. A computer-implemented method for managing the operation of a data connector coupled to a hardware unit, the method comprising:
receiving a pause signal from a finite state machine (FSM) included in the hardware unit, wherein the FSM is configured to maintain the operating state of the data connector and to transition the data connector between operating states, the pause signal indicating that the FSM is transitioning between operating states;
applying one or more configuration changes to at least one of the hardware unit and the data connector during a transition between operating states associated with the data connector, wherein applying the one or more configuration changes comprises performing an equalization routine with the data connector and, based on results derived from the equalization routine, changing one or more parameters associated with filters applied to data signals transmitted across the data connector; and
transmitting a continue signal to the FSM notifying the FSM that the one or more configuration changes have been applied.

23. A non-transitory computer-readable medium that, when executed by a processing unit, causes the processing unit to manage the operation of a data connector coupled to a hardware unit, by performing the steps of:
receiving a pause signal from a finite state machine (FSM) included in the hardware unit, wherein the FSM is configured to maintain the operating state of the data connector and to transition the data connector between operating states based on data stored in a set of registers that are coupled to the FSM and populated by the processing unit when executing the non-transitory computer-readable medium, the pause signal indicating that the FSM is transitioning between operating states;
applying one or more configuration changes to at least one of the hardware unit and the data connector during a transition between operating states associated with the data connector, wherein applying the one or more configuration changes comprises performing an equalization routine with the data connector and, based on results derived from the equalization routine, changing one or more parameters associated with filters applied to data signals transmitted across the data connector; and
transmitting a continue signal to the FSM notifying the FSM that the one or more configuration changes have been applied.

24. A computing device configured to manage the operation of a data connector coupled to a hardware unit, comprising:
the data connector; and
the hardware unit, including:
a finite state machine (FSM) configured to maintain the operating state of the data connector and to transition the data connector between operating states, and
a subsystem configured to:
receive a pause signal from the FSM, the pause signal indicating that the FSM is transitioning between operating states;
apply one or more configuration changes to at least one of the hardware unit and the data connector during a transition between operating states associated with the data connector, wherein applying the one or more configuration changes comprises performing an equalization routine with the data connector and, based on results derived from the equalization routine, changing one or more parameters associated with filters applied to data signals transmitted across the data connector; and
transmit a continue signal to the FSM notifying the FSM that the one or more configuration changes have been applied.

* * * * *